June 23, 1931.  A. BAUSHER  1,811,660
IDENTIFIER FOR TOOTHBRUSHES AND THE LIKE
Filed April 1, 1930
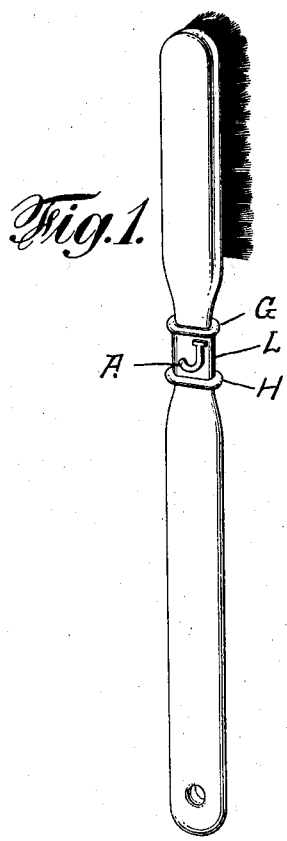
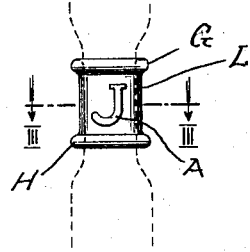
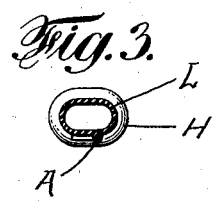
INVENTOR
Harry Bausher.
His ATTORNEY Patented June 23, 1931

1,811,660

UNITED STATES PATENT OFFICE

HARRY BAUSHER, OF MONTCLAIR, NEW JERSEY

IDENTIFIER FOR TOOTHBRUSHES AND THE LIKE

Application filed April 1, 1930. Serial No. 440,679.

This invention relates to an identifier for tooth brushes and the like, that is to a device which may be attached to a tooth brush or the like adapted to indicate for instance the ownership of the article.

A more specific object is to provide an identifier of this type which may be manufactured at small cost and which will be attractive and practical in use.

A more specific object is to provide an identifier which may be easily attached to or removed from the article and which will be usable upon articles of varying sizes.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claim.

In the accompanying drawings which are to be taken as a part of this specification, and in which I have shown merely a preferred form of embodiment of the invention:—

Fig. 1 is a perspective view of an identifier constructed in accordance with this invention and illustrating the same as it appears in use upon a tooth brush.

Fig. 2 is an enlarged side elevational view of the indentifier appearing in Fig. 1, and Fig. 3 is a transverse sectional view taken upon the plane of line III—III of Fig. 2.

This invention being particularly serviceable as means for use in identifying the ownership of tooth brushes it will be here described in this connection, though it will be understood that it may be as readily used in connection with numerous other articles, such as umbrellas, tools or instruments of various kinds.

The identifier, as illustrated, is made of moulded elastic material, such as rubber. It is of general cylindrical form, like a small rubber band. It is so moulded as to provide a relatively thin body portion L and opposite edge re-inforcing beads as G and H. At one or more localities upon the outer surface of the body L there is provided a suitable identifying mark A, such for instance as a letter of the alphabet. In the drawings this identifying mark consists of the letter J and it is indicated as being moulded as an integral part of the body.

If desired the identifying mark A may be separately formed and attached to the body, or it may be moulded as a part of the body but be of a different colored rubber so as to be conspicuously prominent with respect to the ground color of the body.

The device is readily stretchable to facilitate its movement to position upon the tooth brush handle. It may be sufficiently stretched to permit the tooth brush handle to move unobstructedly therethrough to the proper relative position, or it may be slid along the handle to the desired locality, or it may be rolled along the handle to the desired locality and then smoothed out.

It may be placed at any desired position upon the tooth brush handle, but its most attractive position is approximately as illustrated, namely upon the relatively restricted neck portion of the handle, it being understood however that due to the stretchability of the device it may be placed either upon this restricted neck or upon a relatively larger portion of the handle, as may be preferred.

The beads G and H serve several important purposes amongst which may be mentioned:

First, that they re-inforce and strengthen the edge parts of the device so that there is little likelihood of transverse tearing of the body during the operation of placing the device in position upon the tooth brush handle.

Second, that they stand as guards adjacent opposite sides of the identifying mark A and, projecting above the level of the identifying mark, serve thereby to protect the identifying mark against being marred by frictional contact with table surfaces and the like upon which the brush may be laid from time to time.

Third, that they make it possible to form the body L much thinner than would otherwise be necessary, and Fourth, that they provide an attractive and dignified appearance for the device.

It is noteworthy that the identifying mark A as illustrated is of a raised or embossed character so that its presence will be apparent to casual observation even though it be of the same color and material as the remainder of the device.

As many changes could be made in this construction without departing from the scope of the invention as defined in the following claim, it is intended that all matter contained in the above description, or shown in the accompanying drawings, shall be interpreted as illustrative only and not in a limiting sense.

Having thus described my invention, what I claim as new and desire to secure by Letters Patent is:—

An identifier for the purpose referred to consisting of an elastic band adapted by its elasticity to be placed in position upon the article to be identified and to hold itself in position upon said article, said identifier being formed of moulded rubber having a relatively thin body of generally annular contour and having relatively raised marginal beads at its opposite ends moulded as integral parts of the identifier, and said identifier also having a relatively raised identifying mark moulded as an integral part thereof in the space between said marginal beads, said marginal beads being raised to a relatively higher level than said identifying mark to thereby constitute protecting means for said identifying mark.

In testimony whereof I affix my signature.

HARRY BAUSHER.